United States Patent [19]
Pfertner et al.

[11] Patent Number: 5,096,251
[45] Date of Patent: Mar. 17, 1992

[54] FOLDING TOP FOR A MOTOR VEHICLE

[75] Inventors: Kurt Pfertner, Ditzingen; Matthias Aydt, Eberdingen, both of Fed. Rep. of Germany

[73] Assignee: Dr. Ing. h.c.F. Porsche AG, Fed. Rep. of Germany

[21] Appl. No.: 619,922

[22] Filed: Nov. 27, 1990

[30] Foreign Application Priority Data
Nov. 27, 1989 [DE] Fed. Rep. of Germany ....... 3939144

[51] Int. Cl.⁵ .............................................. B60J 7/12
[52] U.S. Cl. .................. 296/120.1; 296/122; 296/116
[58] Field of Search ...................... 296/107, 116, 120.1, 296/121, 122

[56] References Cited

U.S. PATENT DOCUMENTS

| | | | |
|---|---|---|---|
| 264,452 | 9/1882 | Giebel | 296/120.1 |
| 297,147 | 4/1884 | McCurry | 296/120.1 X |
| 921,530 | 5/1909 | Felix | 296/120.1 |
| 2,079,232 | 5/1937 | Smith | 296/120.1 X |
| 2,697,633 | 12/1954 | Slason | 296/116 |

FOREIGN PATENT DOCUMENTS

| | | | |
|---|---|---|---|
| 53725 | 5/1912 | Austria | 296/107 |
| 0303018 | 6/1988 | European Pat. Off. | |
| 324702 | 4/1903 | France | 296/107 |
| 0164614 | 6/1921 | United Kingdom | 296/120.1 |

Primary Examiner—Dennis H. Pedder
Attorney, Agent, or Firm—Evenson, Wands, Edwards, Lenahan & McKeown

[57] ABSTRACT

A folding top for a motor vehicle has a tensioning bow which is arranged on the rearward side of the vehicle and interacts with the folding-top linkage by way of front and rear wind-resisting rods. In order to achieve a taut tensioning of the folding-top covering and avoid a downward and lateral bulging-out of the wind-resisting rods, a supporting device is provided between the tensioning bow and a common connecting area of the two wind-resisting rods. The supporting device, when the folding top is in its closed position, form-lockingly extends around the two wind-resisting rods from below and on both sides of the two wind-resisting rods.

7 Claims, 3 Drawing Sheets

FOLDING TOP FOR A MOTOR VEHICLE

BACKGROUND AND SUMMARY OF THE INVENTION

This invention relates to a folding top for a motor vehicle and, more particularly to a folding top for a convertible motor vehicle which has a rearwardly arranged tensioning bow in operative connection in its lateral area with the folding top linkage via front and rear wind-resisting rods.

A known folding top of this type is disclosed in German reference EP-A 0 303 018. The folding top has a rear-side tensioning bow which, when the top is in a closed position, is held in position by way of a two-part wind-resisting rod.

This type of a folding top, however, has the disadvantage that when the folding-top covering or the wind-resisting rods are tensioned, and as a result of the counterpressure of the sealing, the wind-resisting rods are pressed out of their intended construction position in such a manner that a downward-directed lateral buckling of the wind-resisting rods takes place. This buckling occur toward the outside in the vicinity of the common connecting area of the two wind-resisting rods. In addition, by means of this arrangement, only a relatively low tensioning of the folding-top covering can be achieved.

There is therefore needed a folding top having a folding-top covering which can be tensioned relatively tautly. Further, a folding top is needed such that in the tensioning process, downward-directed as well as lateral buckling-out of the wind-resisting rod is avoided.

These needs are met according to the present invention wherein a supporting device is provided between the tensioning bow located below the wind-resisting rods and the common connecting are located above the rods. When the folding top is in its closed position, the supporting device form-lockingly extends around the wind-resisting rods.

It is an advantage of the folding top of the present invention that the arrangement of the supporting device between the tensioning bow and a common connecting area of the wind-resisting rods, avoids lateral as well as downward-directed buckling-out of the wind-resisting rods. In addition, by achieving a stiffening of the wind-resisting rods, a tauter tensioning of the folding-top covering is obtained. The supporting device further has a simple construction and can be manufactured at reasonable cost.

Other objects advantages and novel features of the present invention will become apparent from the following detailed description of the invention when considered in conjunction with the accompanying drawings.

BRIEF DESCRIPTION OF THE DRAWINGS

FIG. 4 is a view in the direction of arrow D of FIG. 2.

DETAILED DESCRIPTION OF THE DRAWINGS

Figure 1:
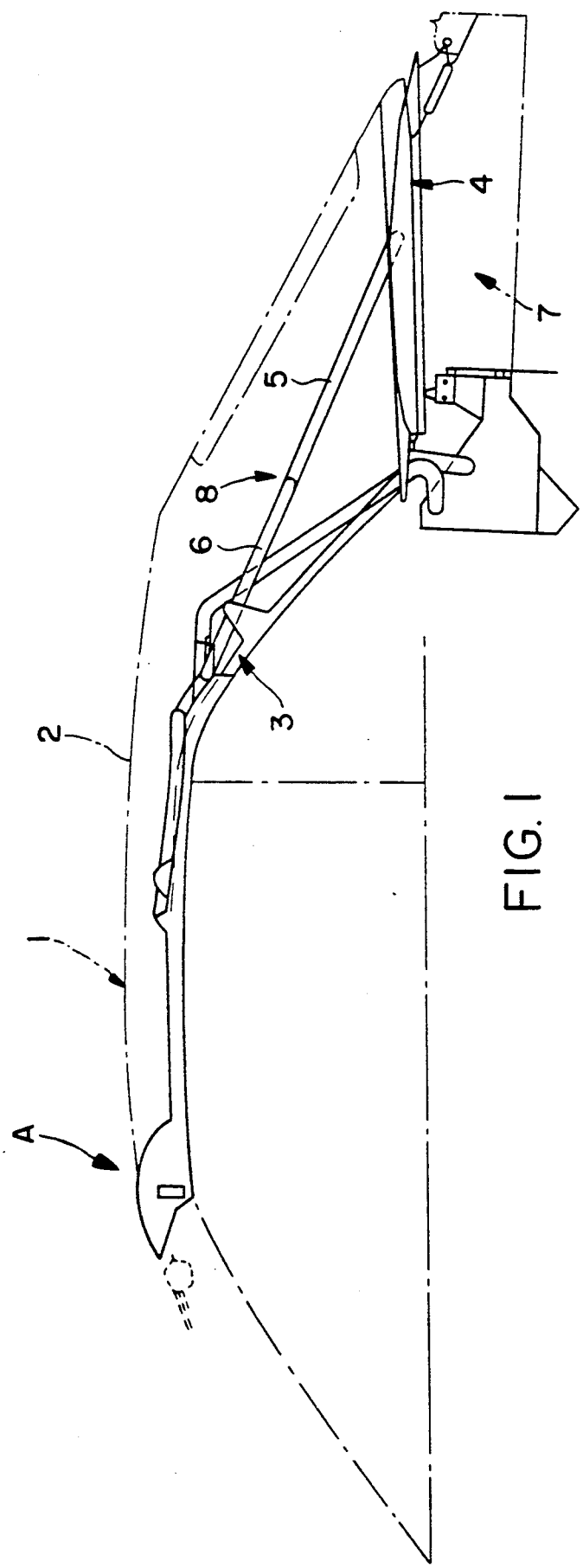
FIG. 1 is a lateral view of a folding top for a motor vehicle.

FIG. 1 schematically illustrates a folding top 1 for a motor vehicle essentially including a folding-top covering 2 and a folding-top linkage 3. In the rear area, a tensioning bow 4 is arranged which, when viewed from the top, is bent in an approximately U-shaped manner. The tensioning bow 4, by way of a rear wind-resisting rod 5 and a front wind-resisting rod 6, is in an operative position with the folding-top linkage 3.

The folding top 1 can be moved from a closed position indicated by arrow A into a folded-together inoperative position (not shown) and vice versa. In the inoperative position, the folding top 1 is situated inside a rear-side top compartment 7 which can be closed via a lid which is not shown in detail.

Figure 2:
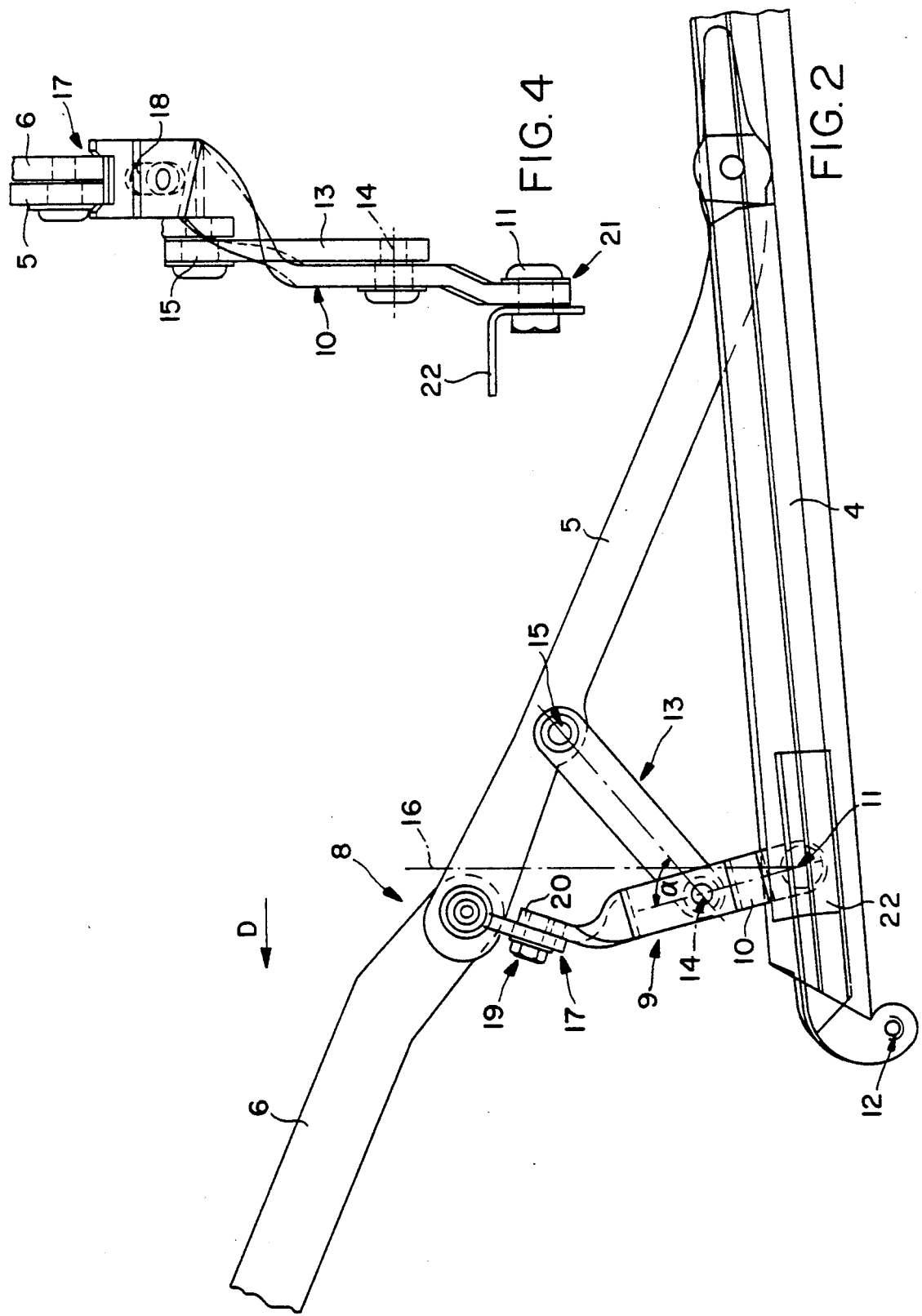
FIG. 2 is a partial lateral view of the rear area of a folding top having a rear-side tensioning bow, a two-part wind-resisting rod and a supporting device according to the present invention.
Figure 3:
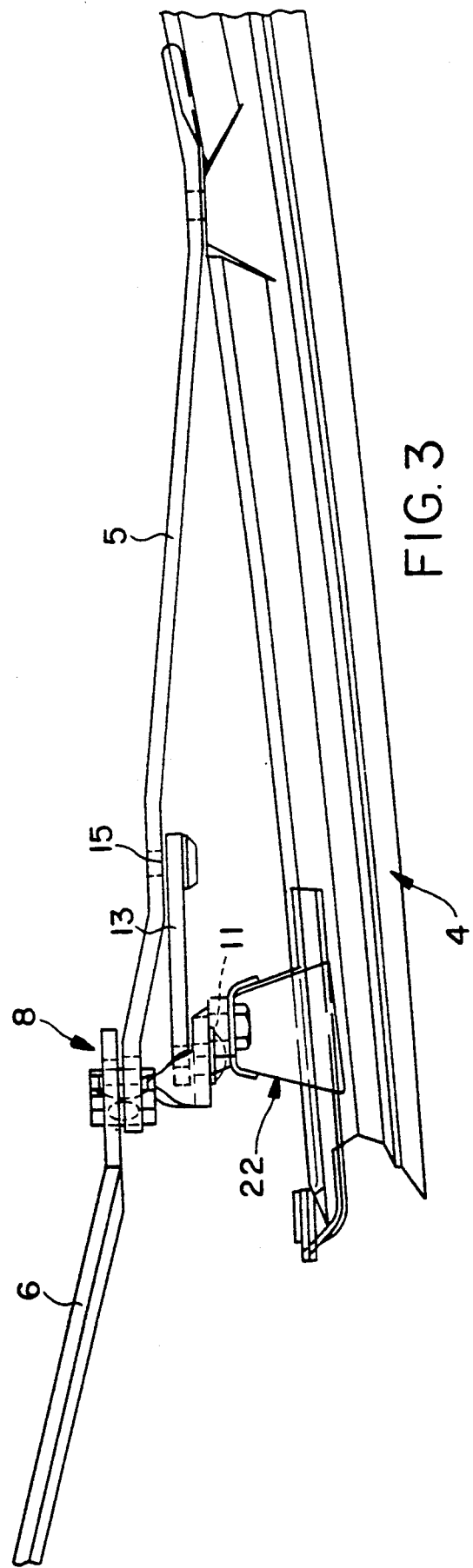
FIG. 3 is a top view of FIG. 2.

Referring to FIG. 2, in order for no lateral and downward-directed buckling-out of the two wind-resisting rods 5, 6 to take place in the common connecting area 8, during the closing of the folding top or during the tensioning of the folding-top covering 2, a supporting device 9 is arranged between the tensioning bow 4 and the common connecting area 8. The supporting device 9, in a form-locking manner, reaches around both sides of the two wind-resisting rods 5, 6 near their juncture 8 from below the rods 5, 6 and in the transverse direction of the vehicle.

The supporting device 9 includes positively controlled supporting bow 10 which is rotatably disposed at the tensioning bow 4 and is arranged approximately below the common connecting area or juncture 8 of the two wind-resisting rods 5, 6. The linking point 11 of the supporting bow 10 at the tensioning bow 4 extends at a distance to the body-side pivot 12 of the tensioning bow 4.

The positive control of the supporting bow 10 takes place by a control lever 13 which, on the one side 14, is rotatably linked to the supporting bow 10 and, on the other side 15, is rotatably linked to the rear wind-resisting rod 5.

The supporting-bow-side linking 14 of the control lever 13 takes place above the tensioning bow 4, whereas the wind-resisting rod-side linking point 15, viewed in the driving direction D, is arranged behind the common connecting area 8.

When the folding top is closed, the control lever 13 and the supporting bow 10 take up an approximately Y-shaped position as shown in FIG. 2. In the case of the closed folding top, the control lever 13 extend approximately 45° from the front bottom to the rear top. The linking of the control lever 13 to the rear wind-resisting rod takes place on the exterior side of the wind-resisting rod 5. The supporting bow 10 extends diagonally upward and toward the front and, with respect to a vertical auxiliary plane 16, is sloped toward the front of the vehicle. As shown in FIG. 2, the supporting bow 10 and the control lever 13 enclose an angle $\alpha 90°$.

At its free end disposed on top, the supporting bow 10 has an approximately U-shaped profiled receiving device 17 which, in a form-locking manner, reaches around the two wind-resisting rods 5, 6 from below and from both sides as seen in FIG. 4. The width of the receiving device 17 is adapted to the width of the two wind-resisting rods 5, 6. When viewed in the vertical direction, a small play may be provided between the bottom side of the two wind-resisting rods 5, 6 and the base of the receiving device 17.

The receiving device 17 is aligned approximately at a right angle with respect to the wind-resisting rods 5,6 as shown in FIG. 2. In addition, when viewed in the vertical direction of FIG. 4, the receiving device 17 is adjustably connected with the supporting bow 10. This is achieved by means of an oblong slot opening 18 which is developed at the receiving device 17. The connection of the receiving device 17 and the supporting bow 10 takes place using a fastening screw 19 which is guided through the slot opening 18 and is screwed into a threaded bore 20 of the supporting bow 10. Along its vertical course, the supporting bow 10 is repeatedly bent inwardly at approximately right angles. A lower end 21 of the supporting bow 10 is rotatably disposed on a holder 22 which is fixedly connected with the tensioning bow 4.

What is claimed is:

1. A folding top for a motor vehicle, comprising:
   a folding top linkage;
   a rearwardly arranged tensioning bow having lateral areas;
   front and rear wind-resisting rods operatively connecting said folding top linkage with said lateral areas of said tensioning bow, said front and rear wind-resisting rods having a common connecting area;
   a supporting device coupled at one end to said tensioning bow and extending between said tensioning bow located below said front and rear wind-resisting rods and the common connecting area located above said tensioning bow, said supporting device, when the folding top is in its erect position, form-lockingly extending from below around both sides of said front and rear wind-resisting rods;
   wherein the supporting device comprises a positively controlled supporting bow which is rotatably disposed on the tensioning bow; and
   further comprising a control lever which, at one side is rotatably disposed on the supporting bow via a first pivot means and, on its other side, is rotatably disposed on the rear wind-resisting rod via a second pivot means, said second pivot means being spaced rearward from the common connecting area for positively controlling said positively controlled supporting bow.

2. A folding top according to claim 1, wherein the supporting bow and the control lever, when the folding top is in the erect position, form an approximately Y-shaped position along a longitudinal plane with respect to the motor vehicle.

3. A folding top according to claim 1, wherein the supporting bow and the control lever enclose an angle (α) less than 90° between one another.

4. A folding top according to claim 1, wherein the supporting bow comprises an approximately U-shaped receiving device at one end disposed on top, said receiving device extending around said front and rear wind-resisting rods from below and from both sides.

5. A folding top according to claim 1, wherein the supporting bow comprises a receiving device adjustably connected with said supporting bow.

6. A folding top according to claim 1, wherein a lower end of said supporting bow is rotatably linked to a holder which is mounted on the tensioning bow.

7. A folding top for a motor vehicle, comprising:
   a folding top linkage;
   a rearwardly arranged tensioning bow having lateral areas;
   front and rear wind-resisting rods operatively connecting said folding top linkage with said lateral areas of said tensioning bow, said front and rear wind-resisting rods having a common connecting area;
   a supporting device coupled at one end to said tensioning bow and extending between said tensioning bow located below said front and rear wind-resisting rods and the common connecting area located above said tensioning bow, said supporting device, when the folding top is in its erect position, form-lockingly extending from below around both sides of said front and rear wind-resisting rods;
   wherein the supporting device comprises a positively controlled supporting bow which is rotatably disposed on the tensioning bow, and wherein the supporting bow, when the folding top is in the erect position, is sloped forward with respect to a vertical transverse plane.

* * * * *